United States Patent
Yang et al.

(10) Patent No.: US 12,040,502 B2
(45) Date of Patent: Jul. 16, 2024

(54) BATTERY APPARATUS, BATTERY MODULE, AND BATTERY PACK

(71) Applicants: CALB Technology Co., Ltd., Jiangsu (CN); CALB Co., Ltd., Jiangsu (CN)

(72) Inventors: Huijie Yang, Changzhou (CN); Bo Ding, Changzhou (CN); Xiaoyuan Du, Luoyang (CN); Lihui Chang, Luoyang (CN)

(73) Assignees: CALB Technology Co., Ltd., Jiangsu (CN); CALB Co., Ltd., Jiangsu (CN)

( * ) Notice: Subject to any disclaimer, the term of this patent is extended or adjusted under 35 U.S.C. 154(b) by 70 days.

(21) Appl. No.: 17/378,772

(22) Filed: Jul. 19, 2021

(65) Prior Publication Data
US 2022/0367962 A1    Nov. 17, 2022

(30) Foreign Application Priority Data
May 12, 2021  (CN) .......................... 202110517143.X

(51) Int. Cl.
*H01M 50/296*  (2021.01)
*H01M 50/209*  (2021.01)
*H01M 50/588*  (2021.01)

(52) U.S. Cl.
CPC ....... *H01M 50/296* (2021.01); *H01M 50/209* (2021.01); *H01M 50/588* (2021.01)

(58) Field of Classification Search
CPC . H01M 50/296; H01M 50/209; H01M 50/588
See application file for complete search history.

(56) References Cited

U.S. PATENT DOCUMENTS

| | | | |
|---|---|---|---|
| 9,837,687 B2 | 12/2017 | Lee et al. | |
| 2017/0352850 A1* | 12/2017 | Nagane | H01M 50/209 |

(Continued)

FOREIGN PATENT DOCUMENTS

| | | |
|---|---|---|
| CN | 203325984 | 12/2013 |
| CN | 211045501 | 7/2020 |

(Continued)

OTHER PUBLICATIONS

"Search Report of Europe Counterpart Application", issued on Feb. 18, 2022, p. 1-p. 8.

(Continued)

*Primary Examiner* — Brian R Ohara
*Assistant Examiner* — Emily Elizabeth Freeman
(74) *Attorney, Agent, or Firm* — JCIP GLOBAL INC.

(57) ABSTRACT

A battery apparatus includes batteries arranged in a first direction; an end plate disposed at an end of the battery apparatus and having adjacent third and fourth surfaces; a protective support disposed on the end plate and having adjacent first and second surfaces. The first and third surfaces are disposed opposite to each other, and the second and fourth surfaces face the batteries; the fourth surface has an adhesive layer; the protective support has a notch at a junction of the first and second surfaces, and the notch is a first notch, and/or the end plate is provided with a notch at a junction of the third and fourth surfaces, and the notch is a second notch; a first (first notch and third surface), second (second notch and first surface), or third (first and second notches) combination forms a groove, and an opening of the groove faces the batteries.

17 Claims, 10 Drawing Sheets

(56) References Cited

U.S. PATENT DOCUMENTS

| | | | |
|---|---|---|---|
| 2018/0277800 A1* | 9/2018 | Zhang | H01M 50/209 |
| 2020/0203777 A1* | 6/2020 | Wang | H01M 10/425 |
| 2020/0388805 A1 | 12/2020 | Yoo et al. | |
| 2021/0408641 A1* | 12/2021 | Watahiki | H01M 50/507 |

FOREIGN PATENT DOCUMENTS

| | | |
|---|---|---|
| CN | 111525050 | 8/2020 |
| CN | 211980699 | 11/2020 |
| CN | 212991185 | 4/2021 |
| WO | 2019174087 | 9/2019 |

OTHER PUBLICATIONS

Office Action of China Counterpart Application, with English translation thereof, issued on Oct. 20, 2022, pp. 1-22.

\* cited by examiner

BATTERY APPARATUS, BATTERY MODULE, AND BATTERY PACK

CROSS-REFERENCE TO RELATED APPLICATION

This application claims the priority benefit of China patent application serial no. 202110517143.X, filed on May 12, 2021. The entirety of the above-mentioned patent application is hereby incorporated by reference herein and made a part of this specification.

BACKGROUND OF THE INVENTION

Field of the Invention

The invention relates to the technical field of batteries, in particular to a battery apparatus, a battery module, and a battery pack.

Description of Related Art

As countries and industries have increasingly strict requirements for the safety of new energy vehicles and battery apparatuses, especially when the battery apparatus is in a hot and humid environment, the insulation and compressive strength in the battery apparatus should be increased, the risk of insulation failure of the battery apparatus should be lowered, and the module environment and the safety performance of the module should be improved. However, the high-voltage support structure of the existing battery apparatus is that a protective support is snapped and mounted on an end plate, an adhesive is applied between the end plate and the battery apparatus, and the adhesive is readily squeezed out and overflows to the outlet terminal busbar and covers the busbar, thus affecting the heat dissipation effect of the busbar. In addition, the high-voltage support structure of the existing battery apparatus is prone to water film, thus damaging the insulation and compressive strength of the battery apparatus and causing insulation failure to the module. Therefore, the existing battery apparatus may no longer meet the urgent requirements of the current industry development for the insulation and compressive strength and safety performance of the battery apparatus.

SUMMARY

One aspect of the invention provides a battery apparatus including a plurality of batteries, an end plate, and a protective support; the plurality of batteries are arranged in a first direction; the end plate is disposed at an end of the battery apparatus in the first direction; the protective support is disposed on the end plate to protect an output terminal of the battery apparatus; the protective support has a first surface and a second surface adjacent to each other, the end plate has a third surface and a fourth surface adjacent to each other, the first surface and the third surface are disposed opposite to each other, and the second surface and the fourth surface face the batteries in the first direction; the fourth surface is provided with an adhesive layer; the protective support is provided with a notch at a junction of the first surface and the second surface, and the notch is a first notch, and/or, the end plate is provided with a notch at a junction of the third surface and the fourth surface, and the notch is a second notch; a first combination or a second combination or a third combination forms a groove, an opening of the groove faces the batteries in the first direction, the first combination is the first notch and the third surface, the second combination is the second notch and the first surface, and the third combination is the first notch and the second notch.

According to another aspect of the invention, a battery module is provided, wherein the battery module includes the battery apparatus provided by the invention.

According to yet another aspect of the invention, a battery pack is provided, wherein the battery pack includes the battery apparatus provided by the invention.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
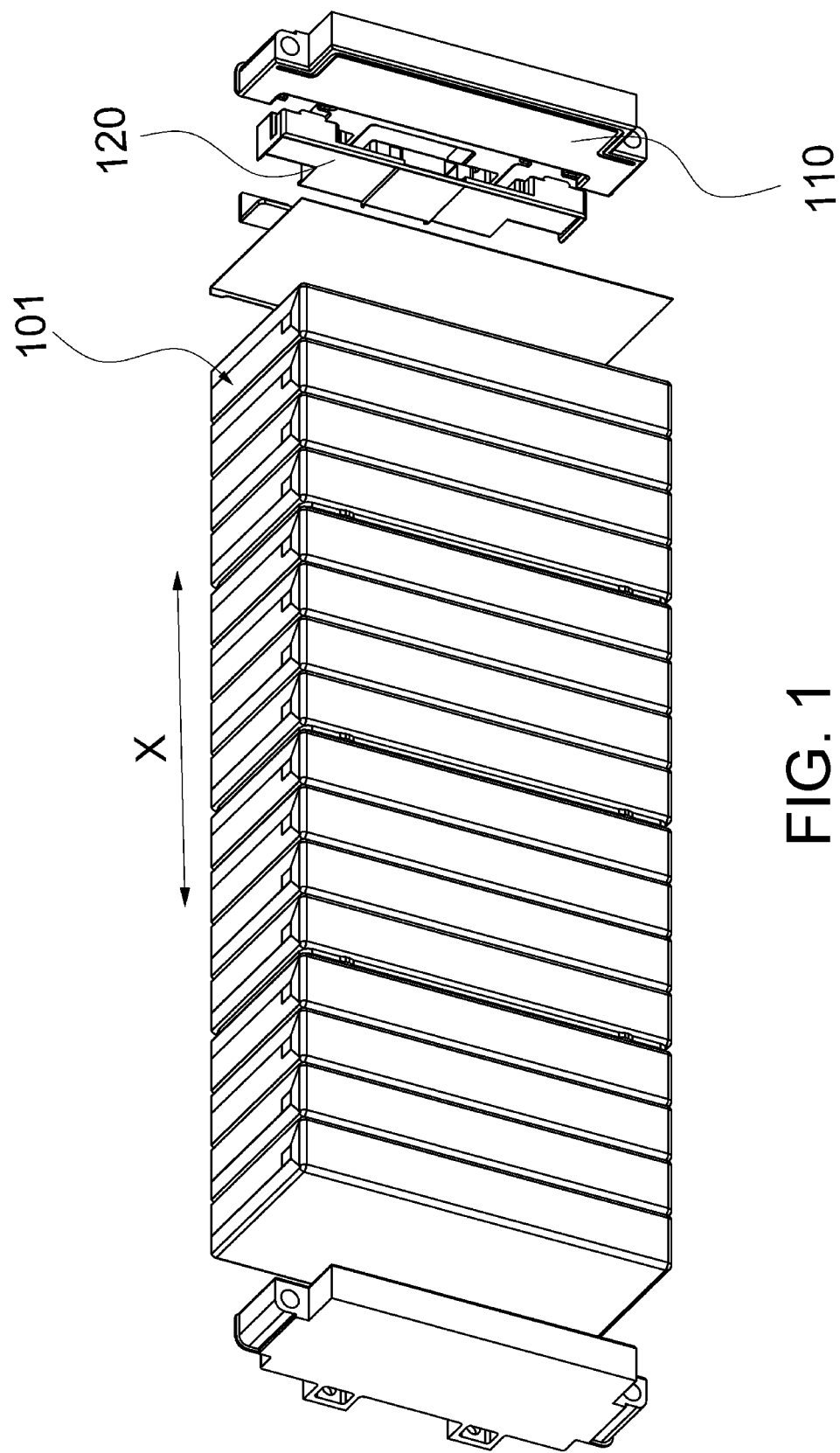
FIG. 1 is a perspective view of a battery apparatus shown according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

One main object of the invention is to overcome at least one of the above drawbacks of the prior art and provide a battery apparatus capable of reducing adhesive overflow and water film risk.

It may be seen from the above technical solution that the advantages and positive effects of the battery apparatus provided by the invention are:

In the battery apparatus provided by the invention, the notch is provided at the connection between the end plate and the protective support, and the groove is formed using the notch after the end plate and the protective support are connected, thus significantly increasing the adhesive holding effect. As a result, the support structure of the battery apparatus does not readily cause overflow of the adhesive, which is conducive to the overflow of the adhesive into the groove during the assembly process of the battery apparatus, and the assembly strength of the protective support and the end plate is improved. At the same time, the support structure of the battery apparatus does not readily produce a water film, thus ensuring insulation and compressive strength and improving safety performance.

Battery Apparatus Embodiment 1

FIG. 1 representatively shows a perspective view of a battery apparatus provided by the invention. In the exemplary embodiment, the battery apparatus provided by the invention is exemplified by being applied to an electric vehicle battery pack. It is easily understood by those skilled in the art that, in order to apply the related design of the invention to other types of battery equipment, many modifications, additions, substitutions, deletions, or other changes are made to the following specific embodiments, and these changes are still within the scope of the principles of the battery apparatus provided by the invention.

Figure 2:
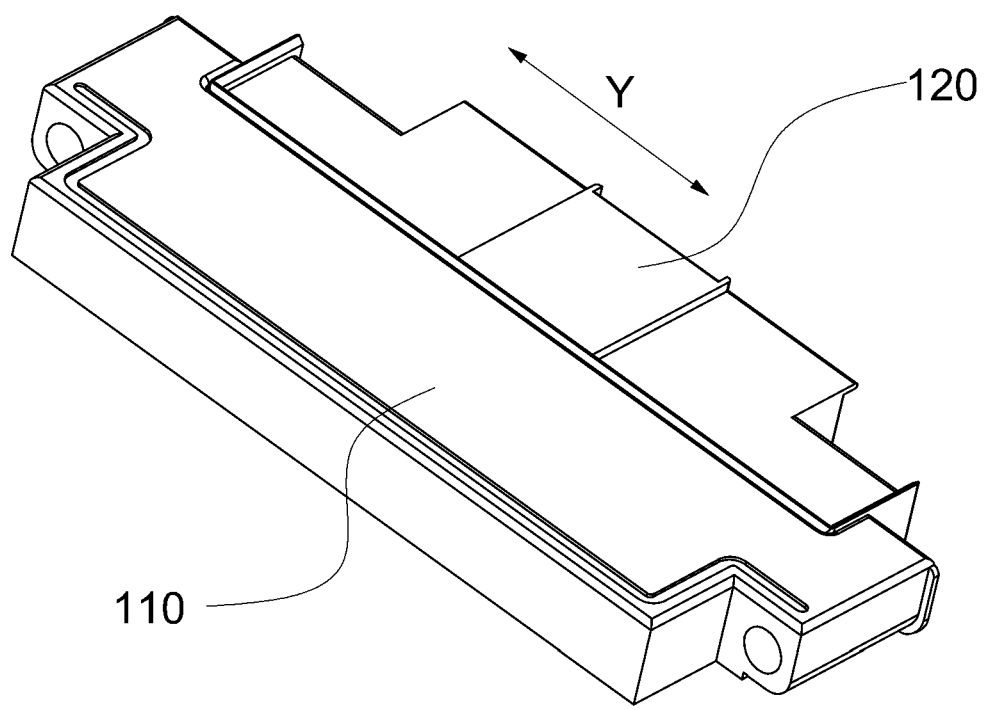
FIG. 2 is a perspective view of the combined structure of the end plate and the protective support of the battery apparatus shown in FIG. 1.
Figure 3:
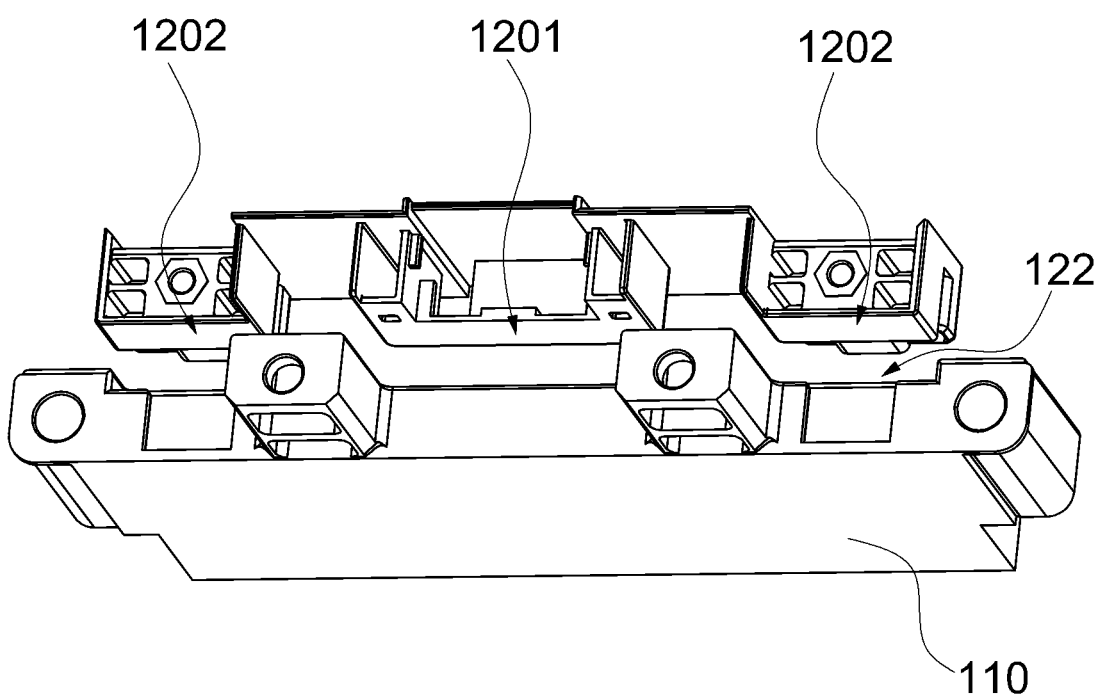
FIG. 3 is an exploded view of the combined structure of the end plate and the protective support of the battery apparatus shown in FIG. 1.
Figure 4:
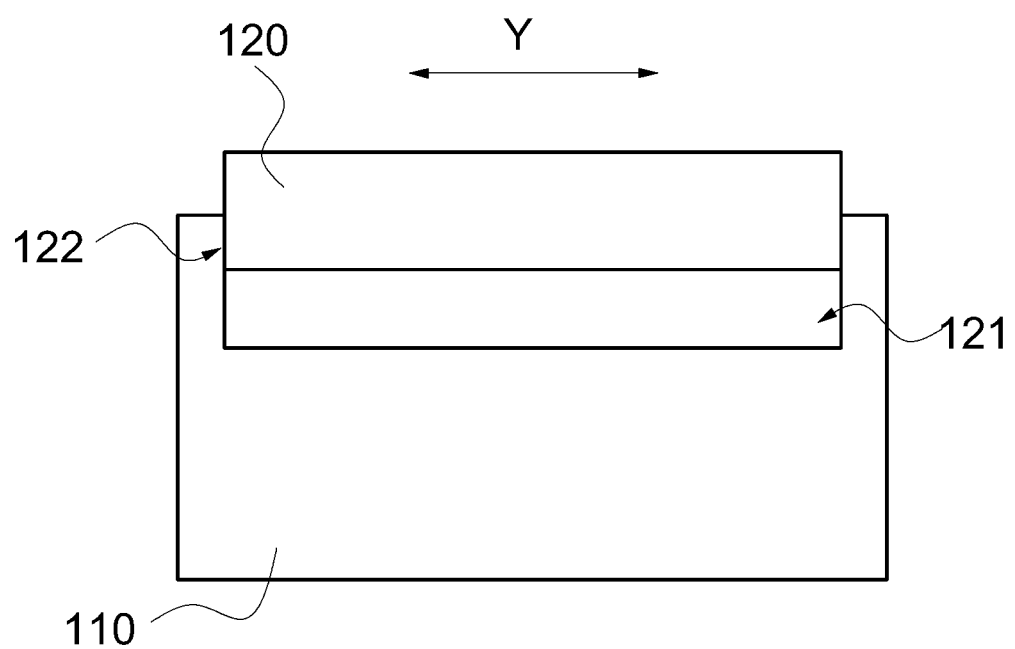
FIG. 4 is a schematic diagram showing a portion of the structure of a battery apparatus according to an exemplary embodiment.
Figure 5:
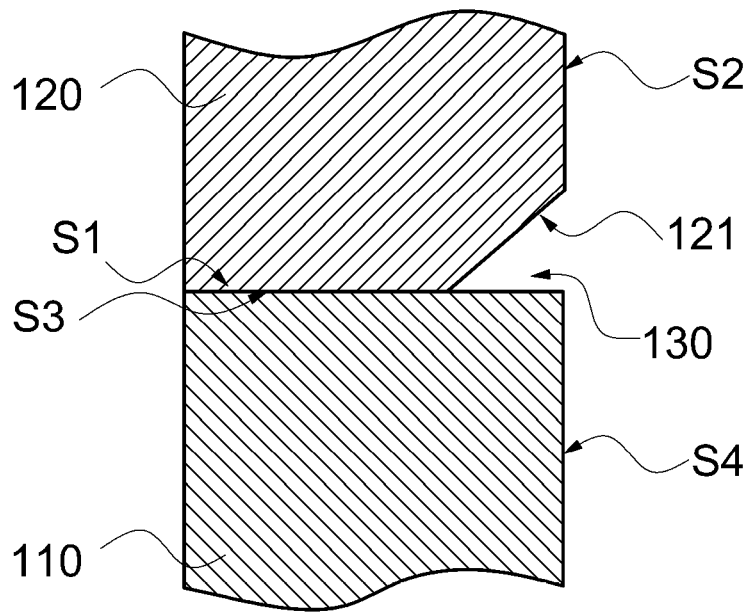
FIG. 5 is a cross-sectional view along line A-A in FIG. 4.

As shown in FIG. 1, in the present embodiment, the battery apparatus provided by the invention includes a plurality of batteries 101, an end plate 110, and a protective support 120, and the plurality of batteries 101 are arranged in a first direction X. The end plate 110 is disposed at the end of the batteries 101 in the first direction X. The protective support 120 is disposed on the end plate 110 to protect the output terminal of the battery apparatus. Please refer to FIG. 2 to FIG. 5 in conjunction. FIG. 2 representatively shows a perspective view of the combined structure of the end plate 110 and the protective support 120; FIG. 3 representatively shows an exploded schematic diagram of the end plate 110 and the protective support 120; FIG. 4 representatively shows a schematic diagram of a portion of the structure of the battery apparatus shown in FIG. 1; FIG. 5 representatively shows a cross-sectional view along line A-A in FIG. 4. The structure, connection mode, and functional relationship of each of the main components of the battery apparatus provided by the invention are described in detail below in conjunction with the above figures.

As shown in FIG. 1 to FIG. 5, in the present embodiment, the protective support 120 has a first surface S1 connected to the end plate 110 and a second surface S2 facing the batteries 101, and the end plate 110 has a third surface S3 connected to the protective support 120 and a fourth surface S4 facing the batteries 101. In particular, the first surface S1 and the third surface S3 are disposed opposite to each other, and in the present embodiment, the first surface S1 is in contact with the third surface S3. In other embodiments, the first surface S1 and the third surface S3 may also not be in contact. In addition, the second surface S2 and the fourth surface S4 face the batteries 101 in the first direction X, and the fourth surface S4 is provided with an adhesive layer. On this basis, the protective support 120 is provided with a notch 121 at the junction of the first surface S1 and the second surface S2. Accordingly, when the protective support 120 is disposed at the end plate 110, the notch 121 may form a groove 130 together with the third surface S3. Via the above design, since an adhesive layer is coated between the end plate 110 and the batteries 101, the battery apparatus provided by the invention may improve the adhesive holding effect to prevent the adhesive from overflowing and affecting the busbar. After the adhesive is overflown to the groove 130 and solidified, the fixing strength of the protective support 120 and the end plate 110 may be increased. At the same time, the invention avoids the formation of water mist on the first surface S1 of the battery apparatus in extreme environments such as high temperature and high humidity, thereby lowering the risk of water film formation after constant water mist, thus improving the operating performance and safety performance of this module in extreme environments such as high temperature and high humidity.

Optionally, as shown in FIG. 4, in the present embodiment, the end plate 110 and the protective support 120 may be connected to each other in a snap-fitting manner. For example, the end plate 110 may be provided with a weight reduction cavity 122. On this basis, the protective support 120 may be connected to the weight reduction cavity 122 via a snap connection. Via the above design, not only may the issue of adhesive overflow be solved, but also the connection strength between the protective support 120 and the end plate 110 may be increased.

As shown in FIG. 5, in the present embodiment, the notch 121 is disposed at the junction of the first surface S1 and the second surface S2 of the protective support 120, and a notch is not disposed at the junction of the third surface S3 and the fourth surface S4 of the end plate 110. Via the above design, the protective support 120 may be contacted once adhesive overflow occurs, thus further improving the bonding effect.

Optionally, as shown in FIG. 5, in the present embodiment, the cross-sectional shape of the notch 121 may be approximately triangular. In other words, the notch 121 may be approximately a chipped structure. In other embodiments, the cross-sectional shape of the notch may also be in other shapes, such as a rectangle, a fan, etc., which is not limited to the present embodiment.

Optionally, as shown in FIG. 4, in the present embodiment, in a second direction Y perpendicular to the first direction X, the groove 130 may penetrate two ends of the first surface S1 (and/or the third surface S3). Via the above design, the contact area between the protective support 120 and the end plate 110 may be increased, and the accommodating effect for overflowing adhesive may be further optimized. In other embodiments, the groove may also not penetrate the combined structure formed by the end plate and the protective support, or may be a multi-segment groove structure arranged at intervals, which is not limited to the present embodiment.

Optionally, as shown in FIG. 3, in the present embodiment, the protective support 120 may include a high-voltage protective portion 1202 and a low-voltage protective portion 1201, and the high-voltage protective portion 1202 and the low-voltage protective portion 1201 may be an integral structure. Accordingly, the protective support 120 adopts an integrated structure of a high-voltage portion and a low-voltage portion, so that the protective support 120 may have a larger size in the extending direction of the groove 130, thereby further increasing the capacity of the groove 130 to accommodate overflowing adhesive.

Battery Apparatus Embodiment 2

Based on the above detailed description of the first embodiment of the invention, the second embodiment of the battery apparatus provided by the invention is described below with reference to FIG. 6.

Figure 6:
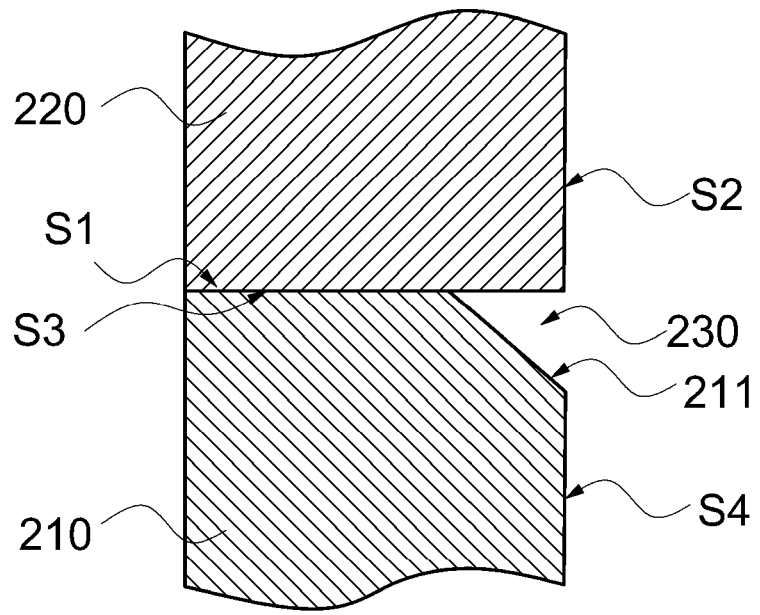
FIG. 6 is a cross-sectional view showing a portion of the structure of a battery apparatus according to another exemplary embodiment.

As shown in FIG. 6, in the present embodiment, a notch 211 is disposed at the junction of the third surface S3 and the fourth surface S4 of an end plate 210, and a notch is not disposed at the junction of the first surface S1 and the second surface S2 of a protective support 220. Accordingly, when the protective support 220 is disposed at the end plate 210, the notch 211 may form a groove 230 together with the first surface S1.

Battery Apparatus Embodiment 3

Based on the above detailed description of the first embodiment and the second embodiment of the invention, the third embodiment of the battery apparatus provided by the invention is described below with reference to FIG. 7.

Figure 7:
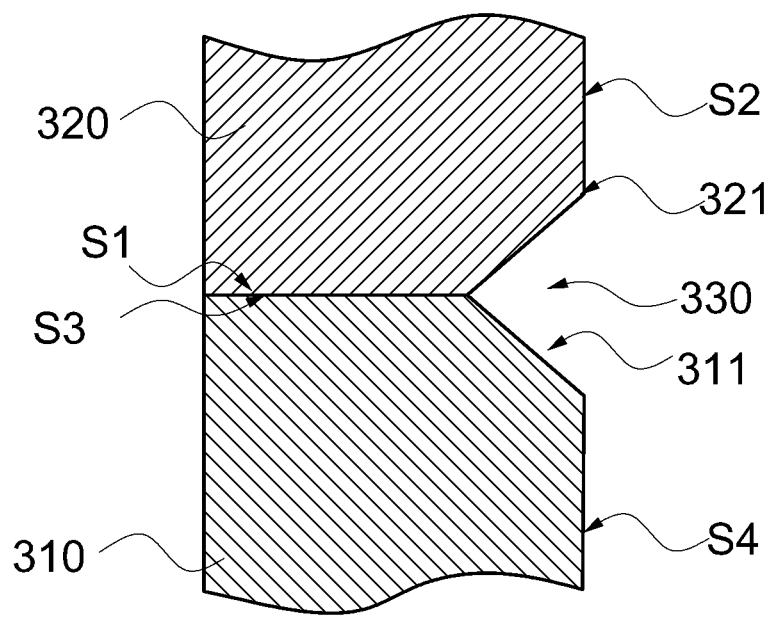
FIG. 7 is a cross-sectional view showing a portion of the structure of a battery apparatus according to another exemplary embodiment.

As shown in FIG. 7, in the present embodiment, a notch 311 is disposed at the junction of the third surface S3 and the fourth surface S4 of an end plate 310, and a notch 321 is disposed at the junction of the first surface S1 and the second surface S2 of a protective support 320. Accordingly, when the protective support 320 is disposed at the end plate 310, the notch 311 and the notch 321 may form a groove 330 together.

Optionally, as shown in FIG. 7, in the present embodiment, taking the first surface S1 (or the third surface S3) as a reference, the cross-sectional shapes of the two notches 311 and 321 respectively disposed on the end plate 310 and the protective support 320 may be symmetrical. Accordingly, when the protective support 320 is disposed on the end plate 310, the cross section of the groove 330 formed by the notch 311 and the notch 321 together may be substantially a symmetrical figure based on the first surface S1 (or the second surface S2).

Based on the detailed description of the above several embodiments, it should be understood that among the various possible embodiments that conform to the design concept of the battery apparatus provided by the invention, a notch may be disposed at the junction of the first surface and the second surface, such as the first notch, and a notch may also be disposed at the junction of the third surface and the fourth surface, such as the second notch. On this basis, a first combination or a second combination or a third combination forms a groove, an opening of the groove faces the batteries in the first direction, the first combination is the first notch and the third surface, the second combination is the second notch and the first surface, and the third combination is the first notch and the second notch.

Battery Apparatus Embodiment 4

Based on the above detailed description of the first embodiment of the invention, the fourth embodiment of the battery apparatus provided by the invention is described below with reference to FIG. 8.

Figure 8:
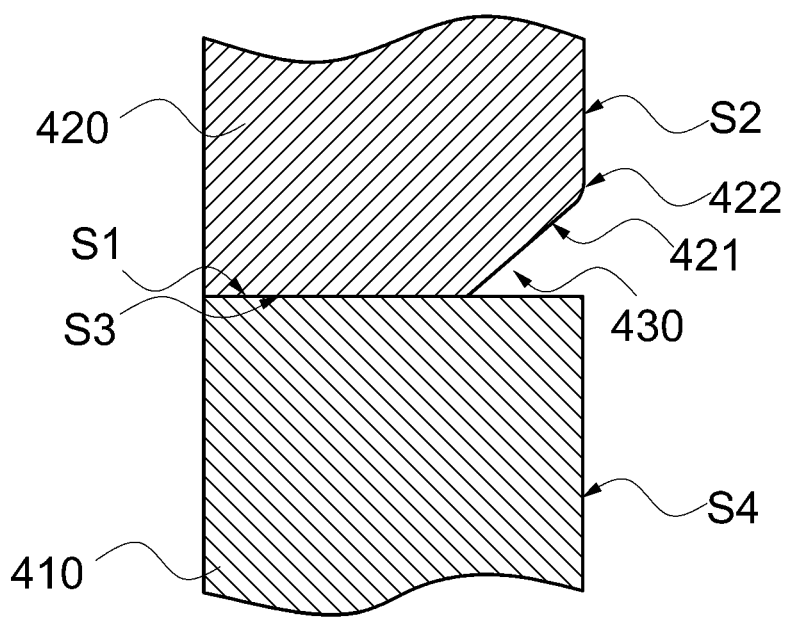
FIG. 8 is a cross-sectional view showing a portion of the structure of a battery apparatus according to another exemplary embodiment.

As shown in FIG. 8, in the present embodiment, a notch 421 is disposed at the junction of the first surface S1 and the second surface S2 of a protective support 420, and a notch is not disposed at the junction of the third surface S3 and the fourth surface S4 of an end plate 410. On this basis, a chamfered structure 422 may be provided at the junction of the notch 421 and the second surface S2 of the protective support 420. The chamfered structure 422 may be, but is not limited to, a fillet structure or a sloped structure.

Battery Apparatus Embodiment 5

Based on the above detailed description of the third embodiment and the fourth embodiment of the invention, the fifth embodiment of the battery apparatus provided by the invention is described below with reference to FIG. 9.

Figure 9:
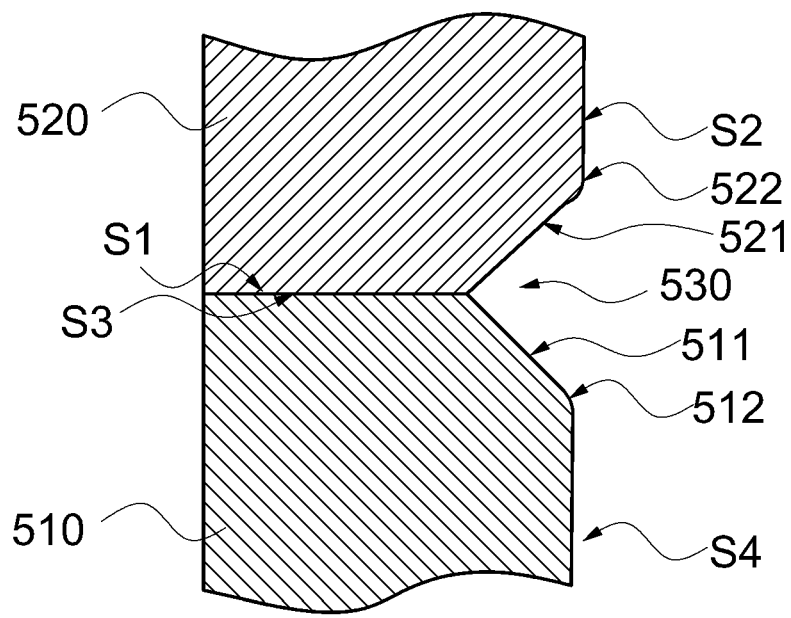
FIG. 9 is a cross-sectional view showing a portion of the structure of a battery apparatus according to another exemplary embodiment.

As shown in FIG. 9, in the present embodiment, a notch 521 is disposed at the junction of the first surface S1 and the second surface S2 of a protective support 520, and a notch 511 is disposed at the junction of the third surface S3 and the fourth surface S4 of an end plate 510.

On this basis, the junction of the notch 521 and the second surface S2 of the protective support 520 may have a chamfered structure 522, and the junction of the notch 511 and the fourth surface S4 of the end plate 510 may have a chamfered structure 512. In other embodiments, when the notch is only provided at the end plate, the junction of the notch and the fourth surface of the end plate may also have a chamfered structure.

Battery Apparatus Embodiment 6

Based on the above detailed description of the first embodiment of the invention, the sixth embodiment of the battery apparatus provided by the invention is described below with reference to FIG. 10.

Figure 10:
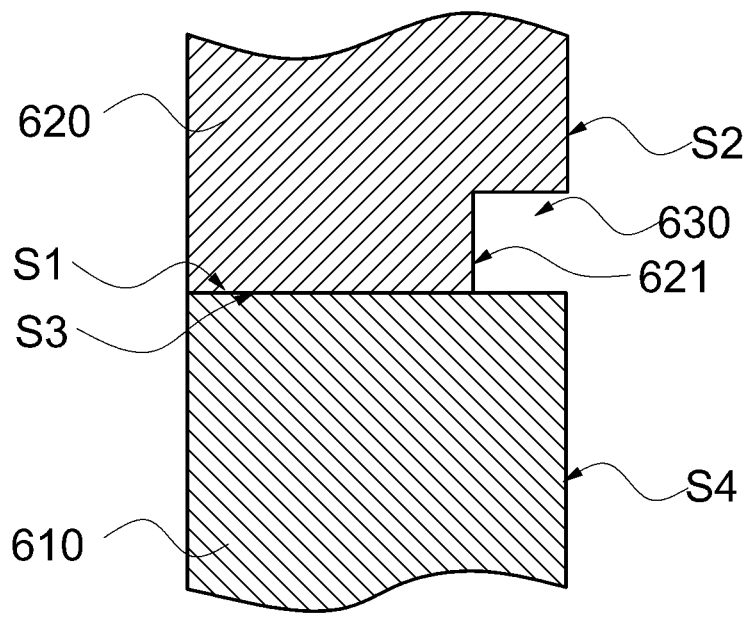
FIG. 10 is a cross-sectional view showing a portion of the structure of a battery apparatus according to another exemplary embodiment.

As shown in FIG. 10, in the present embodiment, a notch 621 is disposed at the junction of the first surface S1 and the second surface S2 of a protective support 620, and a notch is not disposed at the junction of the third surface S3 and the fourth surface S4 of an end plate 610. On this basis, the cross-sectional shape of the notch 621 may be substantially rectangular. In other words, when the protective support 620 is disposed at the end plate 610, the cross-sectional shape of a groove 630 formed by the notch 621 and the third surface S3 together may be substantially rectangular. Via the above design, the invention may further increase the overflowing adhesive capacity of the groove.

Battery Apparatus Embodiment 7

Based on the above detailed description of the second embodiment of the invention, the seventh embodiment of the battery apparatus provided by the invention is described below with reference to FIG. 11.

Figure 11:
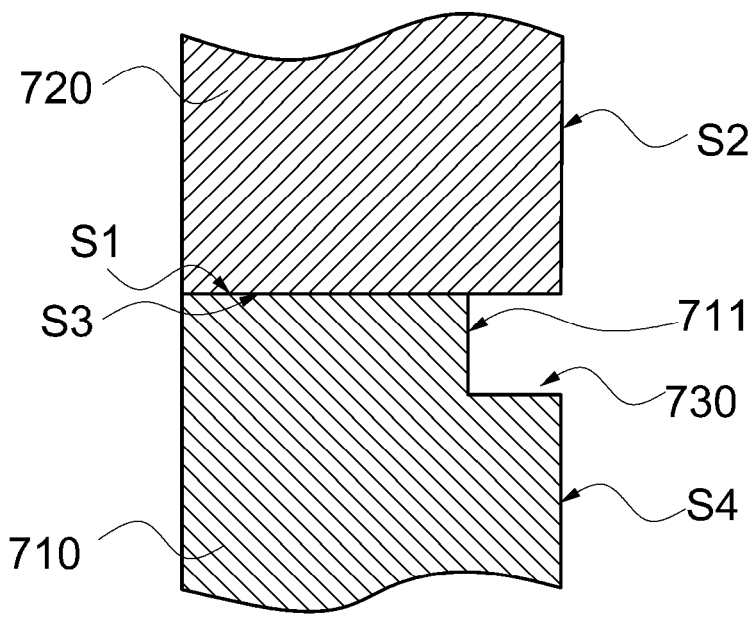
FIG. 11 is a cross-sectional view showing a portion of the structure of a battery apparatus according to another exemplary embodiment.

As shown in FIG. 11, in the present embodiment, a notch 711 is disposed at the junction of the third surface S3 and the fourth surface S4 of an end plate 710, and a notch is not disposed at the junction of the first surface S1 and the second surface S2 of a protective support 720. On this basis, the cross-sectional shape of the notch 711 may be substantially rectangular. In other words, when the protective support 720 is disposed at the end plate 710, the cross-sectional shape of a groove 730 formed by the notch 711 and the first surface S1 together may be substantially rectangular. Via the above design, the invention may further increase the overflowing adhesive capacity of the groove.

Battery Apparatus Embodiment 8

Based on the above detailed description of the third embodiment of the invention, the eighth embodiment of the battery apparatus provided by the invention is described below with reference to FIG. 12.

Figure 12:
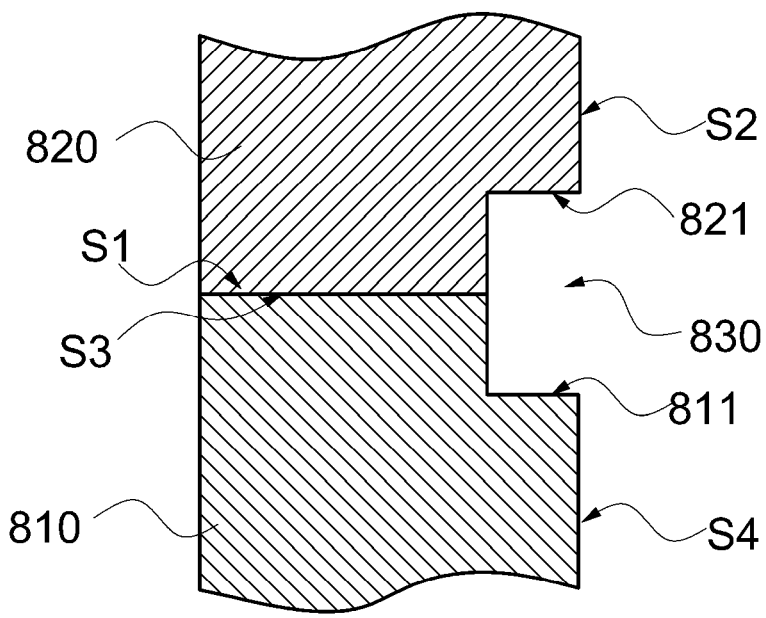
FIG. 12 is a cross-sectional view showing a portion of the structure of a battery apparatus according to another exemplary embodiment.

As shown in FIG. 12, in the present embodiment, a notch 811 is disposed at the junction of the third surface S3 and the fourth surface S4 of an end plate 810, and a notch 821 is disposed at the junction of the first surface S1 and the second surface S2 of a protective support 820. On this basis, the cross-sectional shape of the notch 811 may be substantially rectangular, and the cross-sectional shape of the notch 821 may be substantially rectangular. In other words, when the protective support 820 is disposed at the end plate 810, the cross-sectional shape of a groove 830 formed by the notch 811 and the notch 821 together may be substantially rectangular. Via the above design, the invention may further increase the overflowing adhesive capacity of the groove.

Battery Apparatus Embodiment 9

Based on the above detailed description of the sixth embodiment of the invention, the ninth embodiment of the battery apparatus provided by the invention is described below with reference to FIG. 13.

Figure 13:
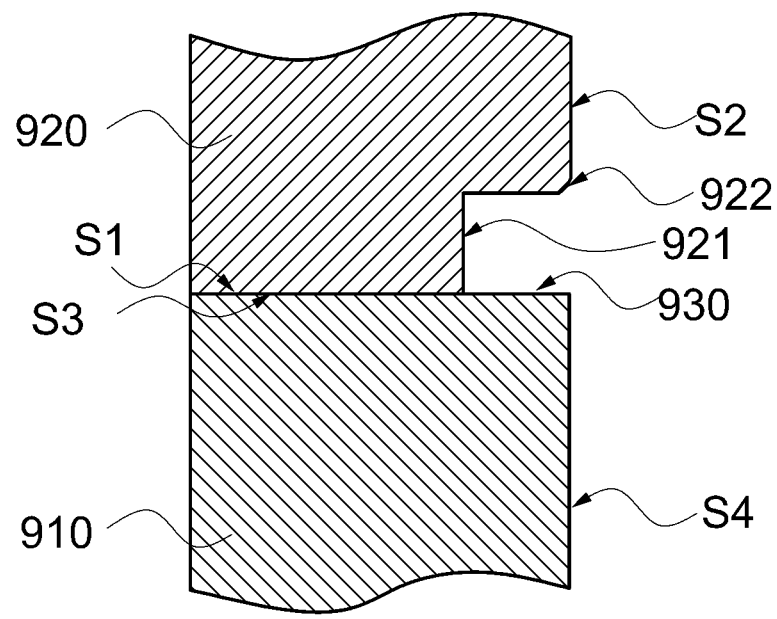
FIG. 13 is a cross-sectional view showing a portion of the structure of a battery apparatus according to another exemplary embodiment.

As shown in FIG. 13, in the present embodiment, a notch 921 is disposed at the junction of the first surface S1 and the second surface S2 of a protective support 920, the cross-sectional shape of the notch 921 is substantially rectangular, and a notch is not disposed at the junction of the third surface S3 and the fourth surface S4 of an end plate 910. On this basis, a chamfered structure 922 may be provided at the junction of the notch 921 and the second surface S2 of the protective support 920. The chamfered structure 922 may be, but is not limited to, a fillet structure or a sloped structure.

Battery Apparatus Embodiment 10

Based on the above detailed description of the eighth embodiment and the ninth embodiment of the invention, the tenth embodiment of the battery apparatus provided by the invention is described below with reference to FIG. 14.

Figure 14:
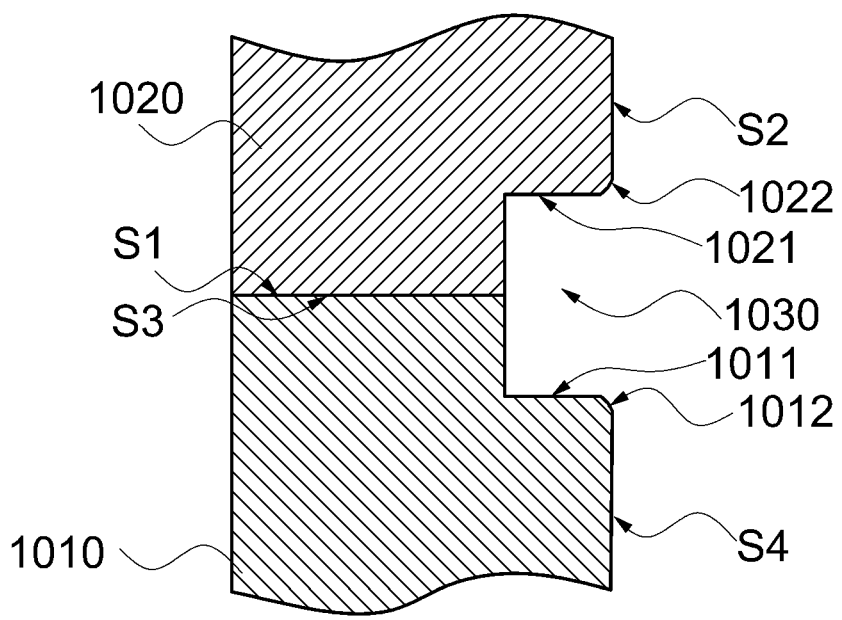
FIG. 14 is a cross-sectional view showing a portion of the structure of a battery apparatus according to another exemplary embodiment.

As shown in FIG. 14, in the present embodiment, a notch 1021 is disposed at the junction of the first surface S1 and the second surface S2 of a protective support 1020, the cross-sectional shape of the notch 1021 is substantially rectangular, and a notch 1011 is disposed at the junction of the third surface S3 and the fourth surface S4 of an end plate 1010, and the cross-sectional shape of the notch 1011 is substantially rectangular. On this basis, the junction of the notch 1021 and the second surface S2 of the protective support 1020 may have a chamfered structure 1022, and the junction of the notch 1011 and the fourth surface S4 of the end plate 1010 may have a chamfered structure 1012.

Battery Apparatus Embodiment 11

Based on the above detailed description of the first embodiment of the invention, the eleventh embodiment of the battery apparatus provided by the invention is described below with reference to FIG. 15.

Figure 15:
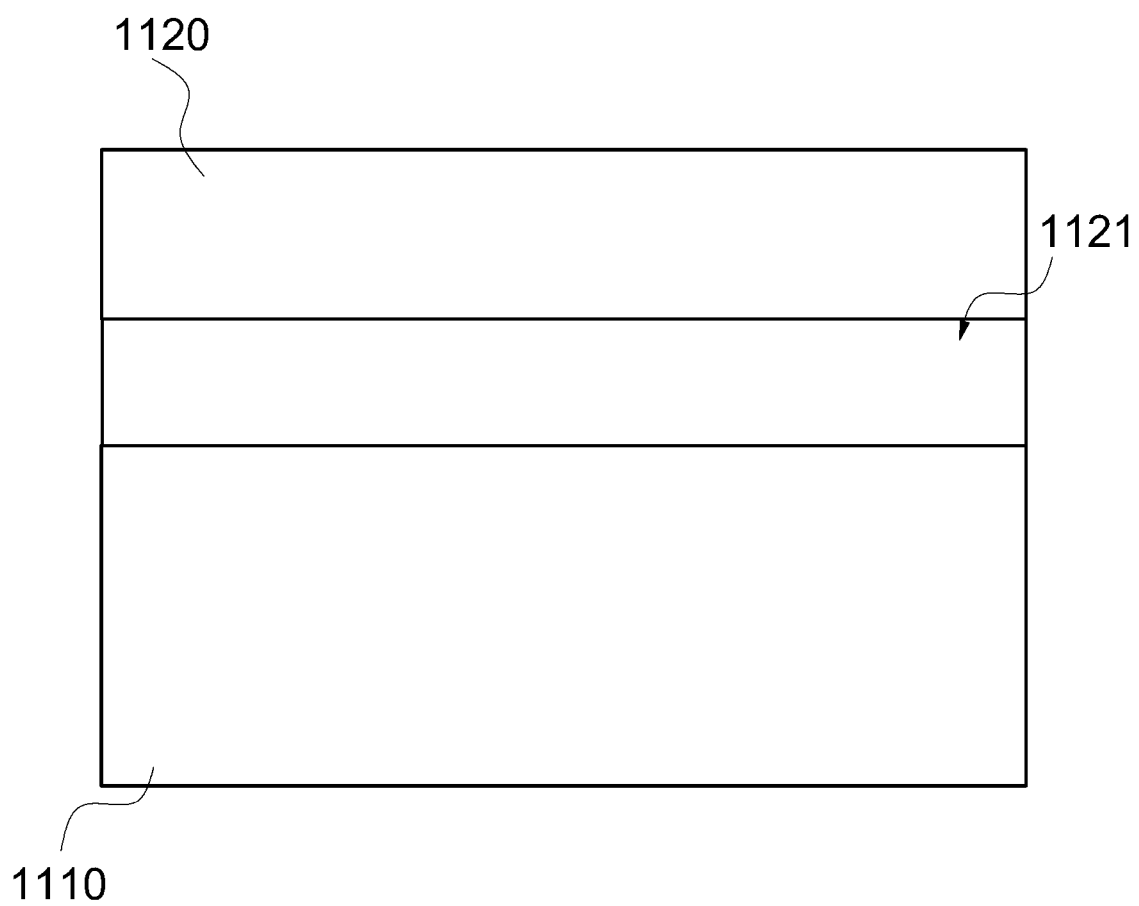
FIG. 15 is a schematic diagram showing a portion of the structure of a battery apparatus according to another exemplary embodiment.

As shown in FIG. 15, in the present embodiment, an end plate 1110 may not be provided with a weight reduction groove, and a protective support 1120 is directly disposed on the end plate 1110.

Battery Apparatus Embodiment 12

Based on the above detailed description of the first embodiment of the invention, the twelfth embodiment of the battery apparatus provided by the invention is described below with reference to FIG. 16.

Figure 16:
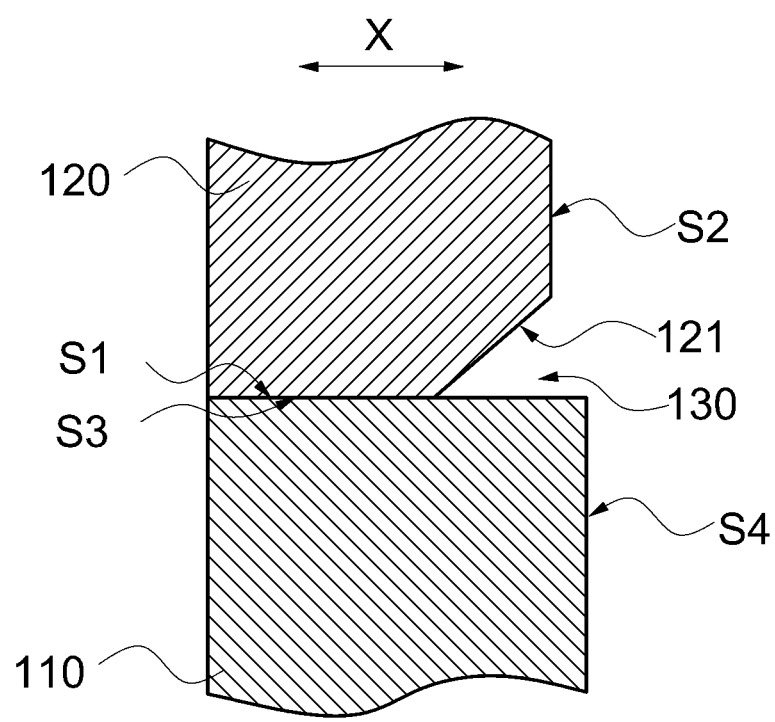
FIG. 16 is a cross-sectional view showing a portion of the structure of a battery apparatus according to another exemplary embodiment.

As shown in FIG. 16, in the present embodiment, in the first direction X, the second surface S2 of the protective support 120 may be staggered from the fourth surface S4 of the end plate 110. Further, in the first direction X, the second surface S2 may be farther from the batteries 101 than the fourth surface S4. Via the above design, the invention may better prevent the adhesive overflowing and covering the busbar.

It should be noted here that the battery apparatuses shown in the figures and described in the present specification are only a few examples of many types of battery apparatuses that may adopt the principles of the invention. It should be clearly understood that the principles of the invention are by no means limited to any detail of the battery apparatuses or any member of the battery apparatuses shown in the figures or described in the present specification.

Battery Module Embodiment

Based on the above detailed description of several exemplary embodiments of the battery apparatus provided by the invention, an exemplary embodiment of the battery module provided by the invention is described below.

In the present embodiment, the battery module provided by the invention includes the battery apparatus provided by the invention and described in detail in the above embodiments.

It may be seen from the above technical solution that the advantages and positive effects of the battery module provided by the invention are:

The battery module provided by the invention adopts the battery apparatus provided by the invention. As a result, the support structure of the battery apparatus does not readily cause overflow of the adhesive, which is conducive to the overflow of the adhesive into the groove during the assembly process of the battery apparatus, and the assembly strength of the protective support and the end plate is improved. At the same time, the support structure of the battery apparatus does not readily produce a water film, thus ensuring insulation and compressive strength and improving safety performance.

It should be noted here that the battery modules shown in the figures and described in the present specification are only a few examples of many types of battery modules that may adopt the principles of the invention. It should be clearly understood that the principles of the invention are by no means limited to any detail or any member of the battery modules shown in the figures or described in the present specification.

Battery Pack Embodiment

Based on the above detailed description of an exemplary embodiment of the battery module provided by the invention, an exemplary embodiment of the battery pack provided by the invention is described below.

In the present embodiment, the battery pack provided by the invention includes the battery module provided by the invention and described in detail in the above embodiments.

It may be seen from the above technical solution that the advantages and positive effects of the battery pack provided by the invention are:

The battery pack provided by the invention adopts the battery module provided by the invention. As a result, the support structure of the battery apparatus does not readily cause overflow of the adhesive, which is conducive to the overflow of the adhesive into the groove during the assembly process of the battery apparatus, and the assembly strength of the protective support and the end plate is improved. At the same time, the support structure of the battery apparatus does not readily produce a water film, thus ensuring insulation and compressive strength and improving safety performance.

It should be noted here that the battery packs shown in the figures and described in the present specification are only a few examples of many types of battery packs that may adopt the principles of the invention. It should be clearly understood that the principles of the invention are by no means limited to any detail or any member of the battery packs shown in the figures or described in the present specification.

Based on the above, in the battery apparatus provided by the invention, a notch is provided at the connection between the end plate and the protective support, and a groove is formed using the notch after the end plate and the protective support are connected, thus significantly increasing the adhesive holding effect. As a result, the support structure of the battery apparatus does not readily cause overflow of the adhesive, which is conducive to the overflow of the adhesive into the groove during the assembly process of the battery apparatus, and the assembly strength of the protective support and the end plate is improved. At the same time, the support structure of the battery apparatus does not readily produce a water film, thus ensuring insulation and compressive strength and improving safety performance.

The exemplary embodiments of the battery apparatus, the battery module, and the battery pack provided by the invention are described and/or illustrated in detail above.

However, the embodiments of the invention are not limited to the specific embodiments described herein. On the contrary, the members and/or steps of each embodiment may be used independently and separately from other members and/or steps described herein. Each member and/or step of one embodiment may also be used in combination with other members and/or steps of other embodiments. When introducing the elements/members/etc. described and/or illustrated herein, terms such as "one", "an", and "above" are used to indicate that there is one or a plurality of elements/members/etc. The terms "containing", "including", and "having" are used to mean open-ended inclusion and mean that there may be additional elements/members/etc. in addition to the listed elements/members/etc. In addition, terms such as "first" and "second" in the claims and the specification are used only as labels, and are not numerical limitations on their objects.

Although the battery apparatus, the battery module, and the battery pack provided by the invention are described according to different specific embodiments, those skilled in the art will recognize that the implementation of the invention may be modified within the spirit and scope of the claims.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery apparatus, comprising:
a plurality of batteries arranged in a first direction;
an end plate disposed at an end of the battery apparatus in the first direction; and
a protective support disposed on the end plate to protect an output terminal of the battery apparatus;
wherein the protective support has a first surface and a second surface adjacent to each other, the end plate has a third surface and a fourth surface adjacent to each other, the first surface and the third surface are disposed opposite to each other, and the second surface and the fourth surface face the batteries in the first direction;

the fourth surface is provided with an adhesive layer, wherein the adhesive layer is coated between the end plate and the batteries;

the protective support is provided with a notch at a junction of the first surface and the second surface, and the notch is a first notch, and/or, the end plate is provided with a notch at a junction of the third surface and the fourth surface, and the notch is a second notch;

a first combination or a second combination or a third combination forms a groove, an opening of the groove faces the batteries in the first direction, the first combination is the first notch and the third surface, the second combination is the second notch and the first surface, and the third combination is the first notch and the second notch; and the first surface faces towards the third surface of the end plate along a direction perpendicular to the first direction and to an extension direction of the groove, and the first surface is in contact with the third surface.

2. The battery apparatus of claim 1, wherein in the first direction, the second surface and the fourth surface are staggered in the first direction.

3. The battery apparatus of claim 2, wherein in the first direction, the second surface is farther from the batteries than the fourth surface.

4. The battery apparatus of claim 1, wherein the end plate is snap-fitted with the protective support.

5. The battery apparatus of claim 1, wherein a cross-sectional shape of the notches is triangular or rectangular; and/or the junction of the first surface and the second surface has a chamfered structure; and/or the junction of the third surface and the fourth surface has a chamfered structure.

6. The battery apparatus of claim 1, wherein in a second direction perpendicular to the first direction, the groove penetrates two ends of the first surface and/or the third surface.

7. The battery apparatus of claim 2, wherein in a second direction perpendicular to the first direction, the groove penetrates two ends of the first surface and/or the third surface.

8. The battery apparatus of claim 3, wherein in a second direction perpendicular to the first direction, the groove penetrates two ends of the first surface and/or the third surface.

9. The battery apparatus of claim 4, wherein in a second direction perpendicular to the first direction, the groove penetrates two ends of the first surface and/or the third surface.

10. The battery apparatus of claim 6, wherein the protective support comprises a high-voltage protective support and a low-voltage protective support, and the high-voltage protective support and the low-voltage protective support are an integrated structure.

11. The battery apparatus of claim 7, wherein the protective support comprises a high-voltage protective support and a low-voltage protective support, and the high-voltage protective support and the low-voltage protective support are an integrated structure.

12. The battery apparatus of claim 8, wherein the protective support comprises a high-voltage protective support and a low-voltage protective support, and the high-voltage protective support and the low-voltage protective support are an integrated structure.

13. The battery apparatus of claim 9, wherein the protective support comprises a high-voltage protective support and a low-voltage protective support, and the high-voltage protective support and the low-voltage protective support are an integrated structure.

14. A battery module, wherein the battery module comprises the battery apparatus of claim 1.

15. A battery pack, wherein the battery pack comprises the battery apparatus of claim 1.

16. A battery pack, wherein the battery pack comprises the battery apparatus of claim 4.

17. A battery pack, wherein the battery pack comprises the battery apparatus of claim 6.

* * * * *